US005750939A

United States Patent [19]

Makinwa et al.

[11] Patent Number: 5,750,939
[45] Date of Patent: May 12, 1998

[54] DATA PROCESSING SYSTEM COMPRISING A GRAPHIC TABLET AND A STYLUS, AND STYLUS FOR USE IN SUCH A SYSTEM

[75] Inventors: Kofi A.A. Makinwa; Paul Mateman, both of Eindhoven, Netherlands

[73] Assignee: U.S. Phillips Corporation, New York, N.Y.

[21] Appl. No.: 568,086

[22] Filed: Dec. 6, 1995

[30] Foreign Application Priority Data

Dec. 7, 1994 [EP] European Pat. Off. .............. 94203558

[51] Int. Cl.[6] .............................. G08C 21/00; G09G 3/02
[52] U.S. Cl. ........................ 178/18; 178/19; 345/179; 345/180
[58] Field of Search ..................... 178/18, 19; 345/173, 345/174, 179, 180

[56] References Cited

U.S. PATENT DOCUMENTS

| 4,672,154 | 6/1987 | Rodgers et al. | 178/19 |
| 5,225,637 | 7/1993 | Rodgers et al. | 178/18 |
| 5,231,381 | 7/1993 | Duwaer | 340/712 |
| 5,276,282 | 1/1994 | Russell | 178/19 |
| 5,345,197 | 9/1994 | Riggio, Jr. | 345/179 |
| 5,461,204 | 10/1995 | Makinwa et al. | 178/19 |
| 5,483,262 | 1/1996 | Izutani | 345/180 |
| 5,510,813 | 4/1996 | Makinwa et al. | 345/179 |

FOREIGN PATENT DOCUMENTS 4140818  5/1992  Japan.

Primary Examiner—Steven Saras
Assistant Examiner—Vijay Shankar
Attorney, Agent, or Firm—Brian J. Wieghaus

[57] ABSTRACT

In a data processing system including a graphic tablet and a wireless stylus cooperating with the tablet, the stylus transmits an electromagnetic field to be received by the tablet. The stylus has a detector whereby a disturbance of the field, caused by a means external of the stylus, can be detected. The stylus also includes a switch whereby the stylus can be switched to a power-saving standby mode in response to the disturbance. A contactless on/off switch is thus realized for the stylus.

20 Claims, 3 Drawing Sheets

DATA PROCESSING SYSTEM COMPRISING A GRAPHIC TABLET AND A STYLUS, AND STYLUS FOR USE IN SUCH A SYSTEM

BACKGROUND OF THE INVENTION

The invention relates to a data processing system, comprising a graphic tablet and a wireless stylus, the stylus being provided with a transmitter for transmitting an electromagnetic field to be received by the tablet, and also comprising a power supply for powering the stylus.

The invention also relates to a stylus for use in such a system.

Simplicity and ease of operation are important aspects of the user interface in a data processing system. Therefore, contemporary user interfaces increasingly utilize a graphic tablet and a stylus which cooperates with the tablet in order to enter commands, selections or text. In such an application the stylus transmits a given electromagnetic field which is intercepted by loops in the tablet. The intercepted field is used to determine the position of the stylus relative to the tablet and this position is used as input for the system. A combination of a graphic tablet with a display screen is described in European Patent Application EP-A 0 421 025 (U.S. Pat. No. 5,231,381). This combination provides a versatile user interface with a variety of possibilities for interaction. For example, the display screen can display a dynamically adaptable menu in which the user indicates a given option by means of the stylus. Another possibility is the acknowledgement on the display screen of information entered by means of the stylus; for example, when handwritten text is entered by means of the stylus, the result can be displayed directly on the display screen in the same way as if writing takes place by a pen on paper in a traditional manner.

U.S. patent application U.S. Ser. No. 08/278,209, assigned to Applicant of the present Application, describes a stylus where the frequency of the transmitted field is dependent on the pressure with which the stylus is pressed onto the tablet. The stylus comprises a device whereby the frequency of the transmitted field can be modified in a suitably detectable manner, whereas the tip of the stylus slides into the stylus a very short distance only.

A system of the kind described in the preamble is known from Japanese Abstract 4-140818. This system comprises a stylus with a battery to deliver power for the transmission of a stylus signal. The energy in the battery is limited and replacement is cumbersome and expensive. The stylus of the known system is switched on by detection of a code signal which is transmitted specifically for this purpose by a facility provided in the tablet.

SUMMARY OF THE INVENTION

It is an object of the invention to provide a system of the kind set forth in which the operational life of the battery in the stylus is prolonged and which does not require an additional facility to transmit a signal for activating the stylus. To this end, the system in accordance with the invention is characterized in that the stylus comprises a detector for detecting a value of an operating characteristic of the transmitter,
that the stylus comprises a switch for switching the stylus to a standby mode in dependence on said value in order to limit the power supplied by the power supply, and that the system comprises a specially proportioned influencing means externally of the stylus in order to modify the electromagnetic field in a direct vicinity of the stylus, thus modifying the operating characteristic of the transmitter. The electromagnetic field is modified by bringing the influencing means in the vicinity of the stylus. This modification influences the operation of the transmitter; this is detected by the detector in the stylus, so that the stylus enters a standby mode and the power supply is switched to a lower level. This mechanism offers the advantage that no additional facility is required for the transmission of a code signal, and that a very simple means suffices. Consequently, it is not necessary to design and construct such an additional facility, so that a more reliable and less expensive system is obtained.

An embodiment of the system in accordance with the invention is characterized in that the detector comprises an ammeter for measuring a current to the transmitter, and that the switch is arranged to switch the stylus to the standby mode when the measured current exceeds a threshold current. The current to the transmitter constitutes a suitable operating characteristic of the transmitter. The ammeter and the switch can be simply and inexpensively constructed as part of the electronic circuitry already present in the stylus.

An embodiment of the system in accordance with the invention is characterized in that the threshold current is approximately 1.5 times larger than a current flowing to the transmitter during normal operation. In this embodiment the modification of the field by positioning the influencing means on the stylus results in a current to the transmitter which amounts to approximately twice the reference current during normal operation. It has been found in practice that a threshold current of 1.5 times the reference current is a suitable adjustment where on the one hand the stylus is not prematurely switched off by small disturbances and on the other hand the stylus is reliably switched off by the positioning of the influencing means.

An embodiment of the system in accordance with the invention is characterized in that the influencing means comprises a sleeve which contains metal and which can be arranged on the stylus. As a result, a metal-induced disturbance occurs in the vicinity of the transmitter, so that the modification of the field is comparatively intense. Furthermore, such a sleeve can be readily manufactured and its presence on the stylus constitutes a suitable visual indication that the stylus is switched off.

An embodiment of the system in accordance with the invention is characterized in that the influencing means comprises a holder which contains metal and is provided in the tablet. After use, the stylus is then stored in a holder in the tablet; this holder is designed so that a metal-induced disturbance occurs near the transmitter. Thus, a comparatively strong modification of the operation of the transmitter occurs when the stylus is stored in the holder. Furthermore, such storage of the stylus constitutes a suitable visual indication that the stylus is switched off.

An embodiment of the system in accordance with the invention is characterized in that the detector comprises a frequency meter for measuring a frequency of a transmitter signal, and that the switch is arranged to switch the stylus to the standby mode when the measured frequency exceeds a threshold frequency. The frequency of the signal in the transmitter constitutes a suitable operating characteristic of the transmitter. The frequency meter and the switch can be simply and inexpensively constructed as part of the electronic circuitry already present in the stylus.

An embodiment of the system in accordance with the invention is characterized in that the influencing means comprises a sleeve which is provided with an LC circuit and can be arranged on the stylus. Thus, an LC circuit is positioned in the vicinity of the coil of the transmitter, so that the change of the frequency of the transmitter signal is comparatively large. Furthermore, such a sleeve can be readily manufactured and its presence on the stylus constitutes a suitable visual indication that the stylus is switched off.

An embodiment of the system in accordance with the invention is characterized in that the detector is arranged to execute the detection operation periodically. In this embodiment the deactivated stylus is periodically switched on, after which the detector detects the value. If the influencing means is no longer detected, the stylus remains switched on; otherwise, the stylus is immediately switched off again.

Other attractive embodiments of the system in accordance with the invention are disclosed in dependent claims.

It is another object of the invention to provide a stylus which is suitable for use in a system as described above and in which the operational life of the battery is prolonged. To this end, the stylus in accordance with the invention comprises a detector for detecting a value of an operating characteristic of the transmitter and a switch for switching the stylus to a standby mode in dependence on the value. Various embodiments of the detector and of the switch have already been described and discussed.

BRIEF DESCRIPTION OF THE DRAWINGS

The invention will be described in detail hereinafter, by way of example, with reference to the drawing; therein.

DETAILED DESCRIPTION OF THE PREFERRED EMBODIMENTS

Figure 1:
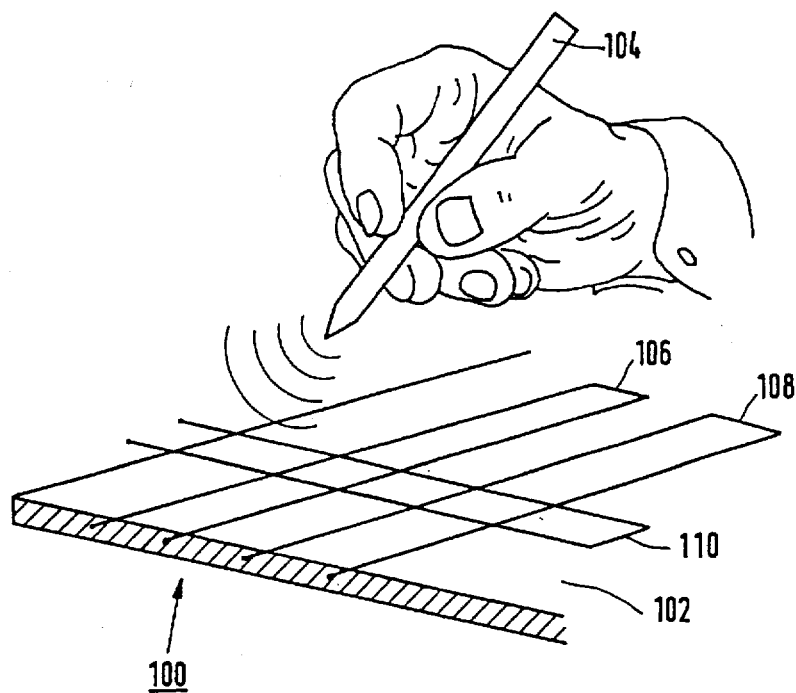
FIG. 1 shows a part of a data processing system.

FIG. 1 shows a part of a data processing system 100 in which the invention is used. This part comprises a graphic tablet 102 and a stylus 104. The tablet 102 comprises a number of electrically conductive loops, for example loops 106, 108 and 110 which serve to determine the position of the transmitting stylus 104 relative to the tablet 102. The operation of the system is described in detail in European Patent Application EP-A 0 421 025 (U.S. Pat. No. 5,231, 381).

Figure 2:
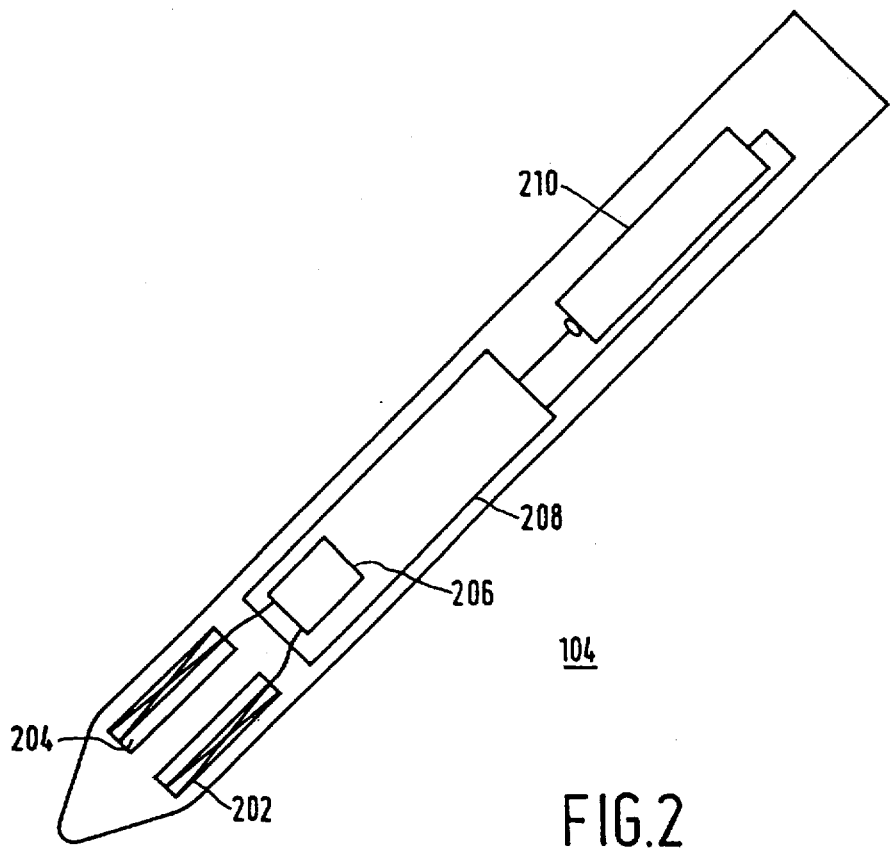
FIG. 2 shows diagrammatically a stylus for use in the system.

FIG. 2 shows diagrammatically some components of the stylus 104. The stylus comprises a coil 202 which is wound about a core 204. The coil 202 is connected to an oscillator circuit 206 and constitutes, in conjunction therewith, a transmitter for transmitting an electromagnetic field when the stylus is in an operational state. The oscillator circuit 206 is accommodated, together with other electronic circuitry, on a support 208 in the stylus. The stylus also comprises a battery 210 which serves inter alia to deliver power for the transmission of the field.

Figure 3:
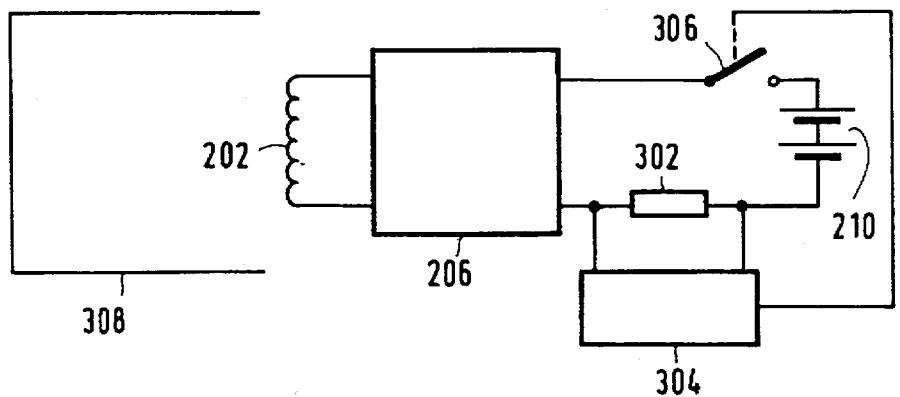
FIG. 3 shows a block diagram of an embodiment of the invention.

FIG. 3 shows a block diagram of an embodiment of the invention. In this embodiment a resistor 302 is included in a supply lead to the oscillator circuit 206 which applies a signal to the coil 202 in order to transmit the electromagnetic field. Using the resistor 302, the detector 304 measures the current to the oscillator circuit and operates the switch 306 in dependence on the current measured. The current increases when a metal object, for example a sleeve 308 containing metal, is arranged in the vicinity of the transmitting coil 202. This is caused by the fact that in conjunction with the coil 202 the metal object forms a transformer, the metal object then behaving as a short-circuited secondary winding. When the increasing current has become significantly larger than the reference current flowing in the case of complete absence of a metal object, the switch 306 is switched off. As a result, the oscillator circuit no longer receives a current and the stylus enters a standby mode in which the power supply need deliver substantially less current. It has been found that in one embodiment of the stylus the reference current amounts to approximately 100 µA in the operational mode and that the current in the standby mode amounts to approximately 5 µA. In this embodiment it was elected to switch off the switch 306 when the current to the transmitter amounts to approximately 150 µA. When the stylus is in the standby mode, the detector will periodically switch on the switch 306, for example every second, and measure the current to the oscillator circuit in order to check whether the sleeve 308 has meanwhile been removed. If this is the case, the stylus remains in the operational mode; if the sleeve is still present, the stylus immediately enters the standby mode again.

The described mechanism enables simple switching on and off by the stylus by arranging a simple object containing metal externally of the stylus. This is a less expensive and more reliable solution than the inclusion of a miniature mechanical switch (microswitch) in the stylus. It is also less expensive and more reliable than the system described in Japanese Abstract 4-140818 in which a separate facility in the graphic tablet transmits a special code signal in response to which the stylus switches itself on.

The principle of the invention is based on externally disturbing the transmitted electromagnetic field and the possibility of detecting this disturbance within the stylus. In FIG. 3 this is implemented by measuring the current to the transmitter. However, it is alternatively possible to use another operating characteristic of the transmitter for this purpose. The frequency of the signal of the oscillator circuit will change due to a disturbance by a metal object. This change can be detected and used as an indication for switching off the switch 306. The change of the frequency of the oscillator signal can be increased by arranging an LC circuit, consisting of a capacitor and a coil comprising one or a few turns, in the vicinity of the transmitter of the stylus. Because of the electromagnetic coupling occurring between the transmitter of the stylus and the LC circuit, the frequency of the signal will decrease significantly. Such an LC circuit can be simply accommodated in a sleeve for the stylus. Another possibility is to use the field strength of the transmitted field as the operating characteristic of the transmitter. This can be implemented by measuring the field strength near the coil 202 in the stylus by means of a Hall sensor. A disturbance by a metal object causes a decrease of the field strength; this can be measured by the Hall sensor. If the decrease is sufficient, the switch 306 can then again be switched off.

Figure 4A:
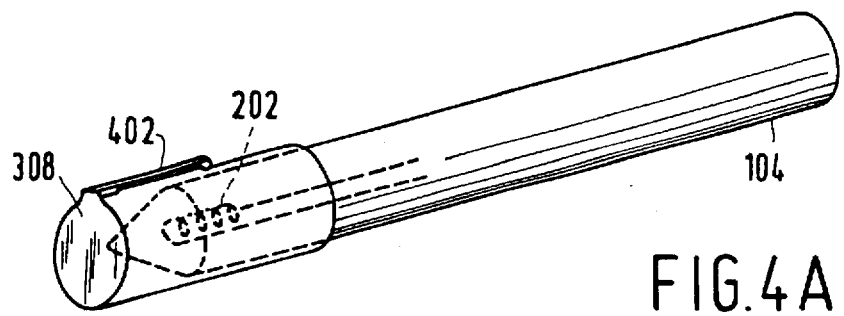
FIGS. 4A and 4B show an embodiment of the stylus in accordance with the invention where the influencing means is formed by a cap sleeve.
Figure 4B:
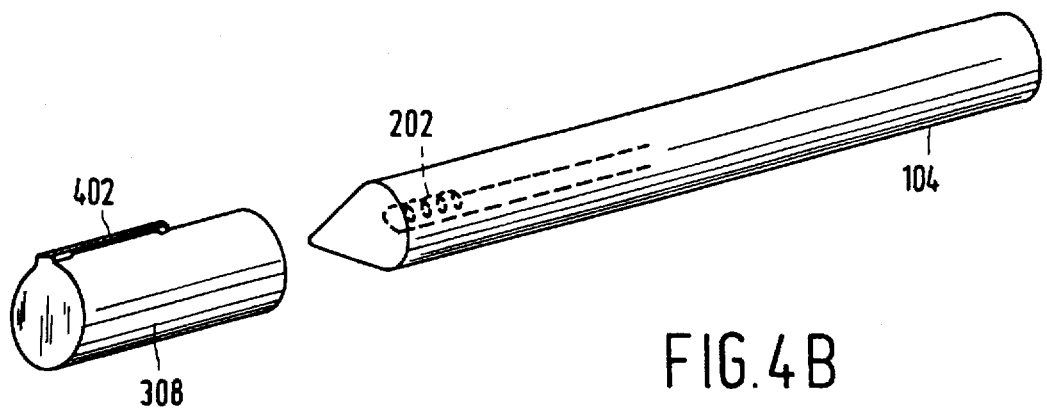

FIGS. 4A and 4B show an embodiment of the stylus in accordance with the invention in which the influencing means is formed by a cap sleeve containing metal. When the cap has been slid onto the stylus as shown in FIG. 4A, the stylus is in the standby mode. Upon periodic activation of the stylus, the detector detects a large current due to the presence of the cap and switches the stylus back to the standby mode again. When the cap is situated at a sufficient distance from the coil in the stylus, as is shown in FIG. 4B, the detector will no longer measure the large current after switching on and the stylus will remain switched on in the operational state. The presence and absence of the cap sleeve constitute suitable indications for the stylus being in the standby mode and the operational mode, respectively, because this is very similar to the use of a cap for a ball-point pen or a felt-tip pen. If desired, the cap sleeve 308 can be provided with a clip 402 in order to enhance the correspondence even further.

Figure 5A:
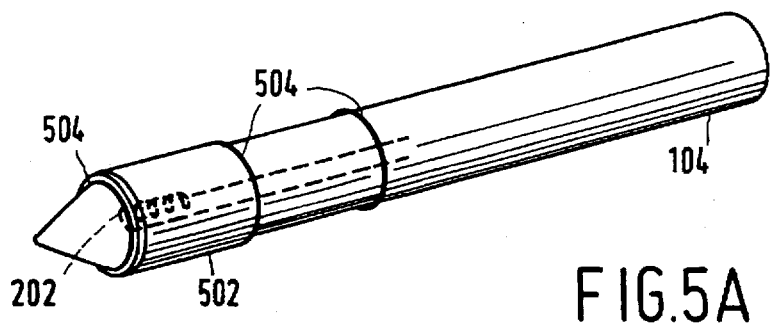
FIGS. 5A and 5B show an embodiment of the stylus in accordance with the invention where the influencing means is a sliding sleeve provided on the stylus.
Figure 5B:
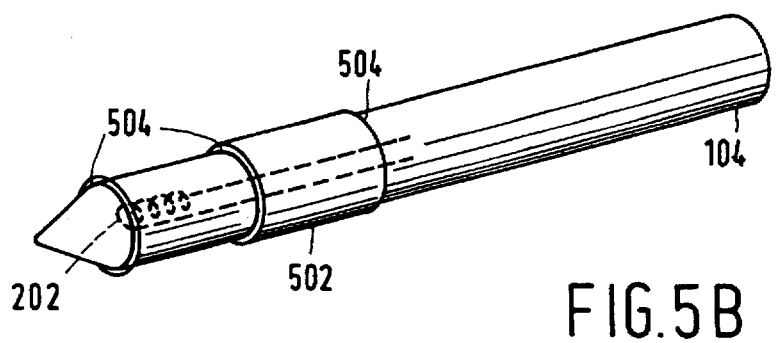

FIGS. 5A and 5B show an embodiment of the stylus in accordance with the invention in which the influencing means consist of a sliding sleeve 502 which contains metal and which can occupy two positions on the stylus. In the position shown in FIG. 5A, the sleeve is situated very near to the transmitting coil, so that the stylus will be switched to the standby mode. In the position shown in FIG. 5B, the sleeve is so remote from the coil that no longer a large current will flow to the transmitter. As a result, the stylus is switched to the operational mode. The sleeve can be fixed in the respective positions, for example by way of ridges on the stylus, denoted by the reference 504 in the Figures, or by way of grooves provided in the stylus. The actual position of the sleeve again forms a suitable indication of the actual mode of the stylus. This can be emphasized, if desired, by printing text on the stylus at the area of the sleeve positions. Furthermore, the sleeve could be constructed to be so long that the tip of the stylus is situated within the sleeve, so that it is emphasized that the stylus is then in the standby mode. The advantage of the sliding sleeve in comparison with the cap sleeve shown in the FIGS. 4A and 4B consists in that it is not separated from the stylus so that it is not readily lost.

When measurement of the frequency of the oscillator signal is utilized, the above sleeve can be attractively provided with an LC circuit consisting of a capacitor and a coil. Such a sleeve with LC circuit causes a larger change of the frequency, so that the switching on and off of the stylus is more reliable.

Figure 6:
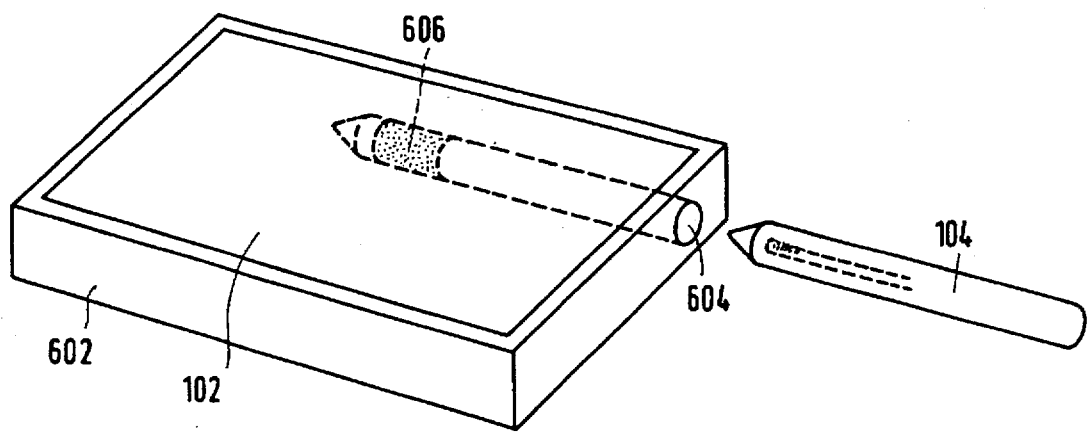
FIG. 6 shows the graphic tablet provided with a holder for the stylus.

FIG. 6 shows the graphic tablet provided with a holder for the stylus. The graphic tablet 102 comprises a housing 602 in which a space is provided for a holder 604. When the stylus 104 is not in use, it can be stored in the holder. The holder 604 is provided with an influencing means 606 at the area of the transmitter of the stylus when the latter is accommodated in the holder. As a result, when arranged in the holder the stylus will switch itself to a standby mode on the basis of the principle described with reference to FIG. 3. When the stylus utilizes the current measurement principle or the field strength measurement principle, the influencing means 606 will be constructed as a metal cylinder around the holder. If the stylus utilizes the principle of frequency measurement, the influencing means 606 will be constructed as an LC circuit consisting of a capacitor and a coil.

We claim:

1. A data processing system, comprising a graphic tablet and a stylus, the stylus including a transmitter for transmitting an electromagnetic field to be received by the tablet and a power supply for powering the stylus, characterized in that:

the stylus comprises a detector for detecting a value of an operating characteristic of the transmitter and a switch coupled to said detector and said power supply for switching the stylus to a standby mode in dependence on said value in order to limit the power supplied by the power supply, and the system comprises a specially proportioned influencing means externally of the stylus for modifying the electromagnetic field in a direct vicinity of the stylus and modifying the value of said operating characteristic of the transmitter to operate said switch.

2. A system as claimed in claim 1, characterized in that the detector comprises an ammeter for measuring a current to the transmitter, and that the switch is arranged to switch the stylus to the standby mode when the measured current exceeds a threshold current.

3. A system as claimed in claim 2, characterized in that the threshold current is approximately 1.5 times larger than a current flowing to the transmitter during normal operation.

4. A system as claimed in claim 1, characterized in that the detector comprises a field strength measuring device for measuring a field strength near the transmitter, and that the switch is arranged to switch the stylus to the standby mode when the measured field strength exceeds a threshold field strength.

5. A system as claimed in claim 1, characterized in that the influencing means comprises a sleeve which contains metal and which can be arranged on the stylus.

6. A system as claimed in claim 1, characterized in that the influencing means comprises a holder which contains metal and is provided in the tablet.

7. A system as claimed in claim 1, characterized in that the detector comprises a frequency meter for measuring a frequency of a transmitter signal, and that the switch is arranged to switch the stylus to the standby mode when the measured frequency exceeds a threshold frequency.

8. A system as claimed in claim 7, characterized in that the influencing means comprises a sleeve which is provided with an LC circuit and can be arranged on the stylus.

9. A system as claimed in claim 7, characterized in that the influencing means comprises a holder which is provided with an LC circuit and is arranged in the tablet.

10. A system as claimed in claim 1, characterized in that the detector is arranged to execute the detection operation periodically.

11. A stylus for use i a system as claimed in claim 1.

12. A system as claimed in claim 2 characterized in that the influencing means comprises a sleeve which contains metal and which can be arranged on the stylus.

13. A system as claimed in claim 3 characterized in that the influencing means comprises a sleeve which contains metal and which can be arranged on the stylus.

14. A system as claimed in claim 4 characterized in that the influencing means comprises a sleeve which contains metal and which can be arranged on the stylus.

15. A system as claimed in claim 2 characterized in that the influencing means comprises a holder which contains metal and is provided in the tablet.

16. A system as claimed in claim 3 characterized in that the influencing means comprises a holder which contains metal and is provided in the tablet.

17. A system as claimed in claim 4 characterized in that the influencing means comprises a holder which contains metal and is provided in the tablet.

18. A system as claimed in claim 2 characterized in that the detector is arranged to execute the detection operation periodically.

19. A system as claimed in claim 3 characterized in that the detector is arranged to execute the detection operation periodically.

20. A stylus for use in a system as claimed in claim 2.

* * * * *